United States Patent [19]
Norwick

[11] Patent Number: 4,845,875
[45] Date of Patent: Jul. 11, 1989

[54] ICE FISHING HOLE MAINTAINING DEVICE

[76] Inventor: Yale Norwick, 32 McGregor Ave., Mahtomedi, Minn. 55115

[21] Appl. No.: 297,110

[22] Filed: Jan. 17, 1989

[51] Int. Cl.$^4$ ............................................. A01K 97/01
[52] U.S. Cl. ......................................................... 43/4
[58] Field of Search ................................. 43/4, 4.5, 17

[56] References Cited

U.S. PATENT DOCUMENTS

| | | | |
|---|---|---|---|
| 2,799,146 | 7/1957 | Meagher | 62/110 |
| 2,914,926 | 12/1959 | Meagher | 62/355 |
| 3,056,272 | 10/1962 | Eilers | 43/4 |
| 3,059,451 | 10/1962 | Anderson | 43/4 |
| 3,555,827 | 1/1971 | Herr | 61/1 |
| 3,813,891 | 6/1974 | Wootten | 62/56 |
| 3,999,322 | 12/1976 | Kooker | 43/4 |
| 4,218,840 | 8/1980 | Cohee | 43/4 |
| 4,294,030 | 10/1981 | Stewart | 43/4 |
| 4,438,757 | 3/1984 | Anderson | 43/4 |
| 4,761,909 | 8/1988 | Christian | 43/4.5 |

FOREIGN PATENT DOCUMENTS 1074584  4/1980  Canada ..................................... 43/4

*Primary Examiner*—Gene P. Crosby
*Attorney, Agent, or Firm*—Haugen and Nikolai

[57] ABSTRACT

A removable inflatable device for temporarily plugging holes in an ice layer for assisting fishermen in maintaining or preserving a previously formed hole in the ice layer during periods of absence when the hole is left unattended. The inflatable device includes a hollow generally cylindrical tubular assembly with an inflatable bladder forming the core, and having a plurality of discrete layers enclosing the inflatable core which include a foam liner enclosing the bladder and an outer sleeve disposed over and firmly enclosing the foam liner and inflatable bladder. The foam liner comprises a layer of synthetic resinous foam with a generally closed-cell structure, and is wrapped about the exterior of the bladder so as to form an overlapped segment along the axial length of the bladder. The outer sleeve is fabricated from a layer of generally non-resilient and water-impermeable material, and has a diameter which is less than the diameter of the bladder when freely inflated, the arrangement being such that the tubular assembly becomes generally erect and rigid upon inflation of the bladder core so as to permit introduction and partial submersion of the assembly when introduced into the hole in the ice.

6 Claims, 3 Drawing Sheets

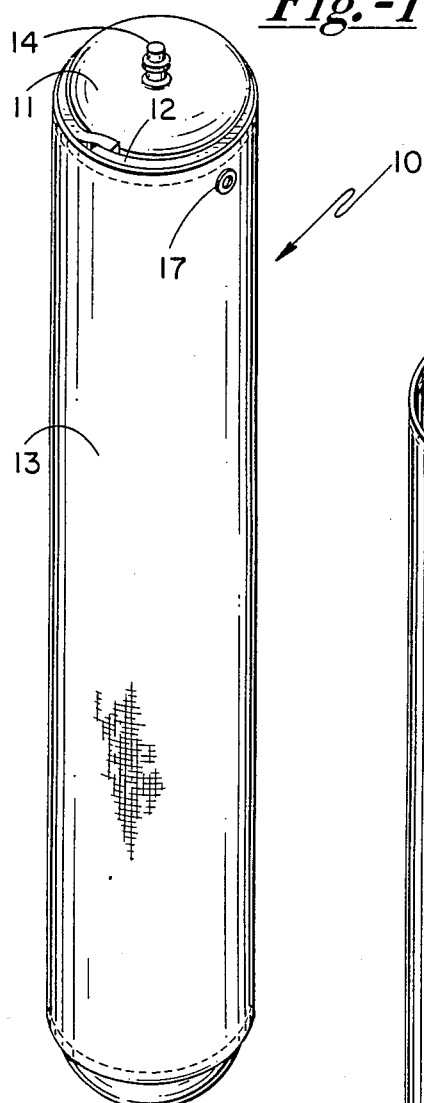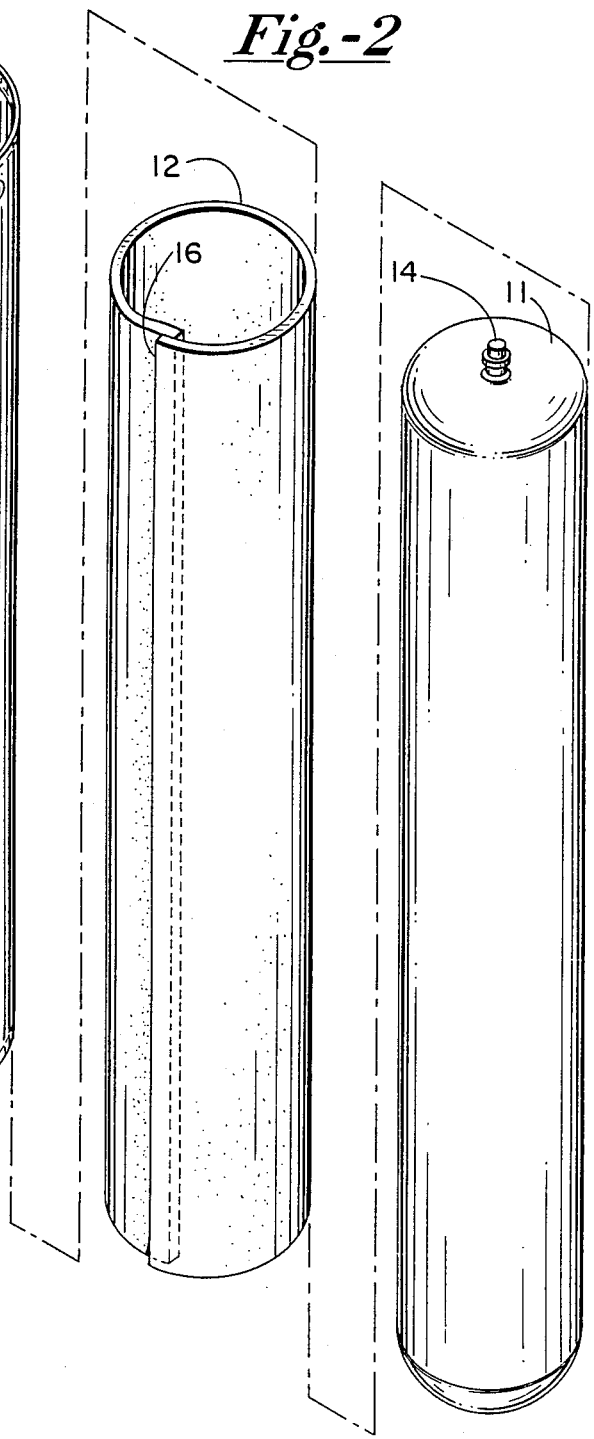

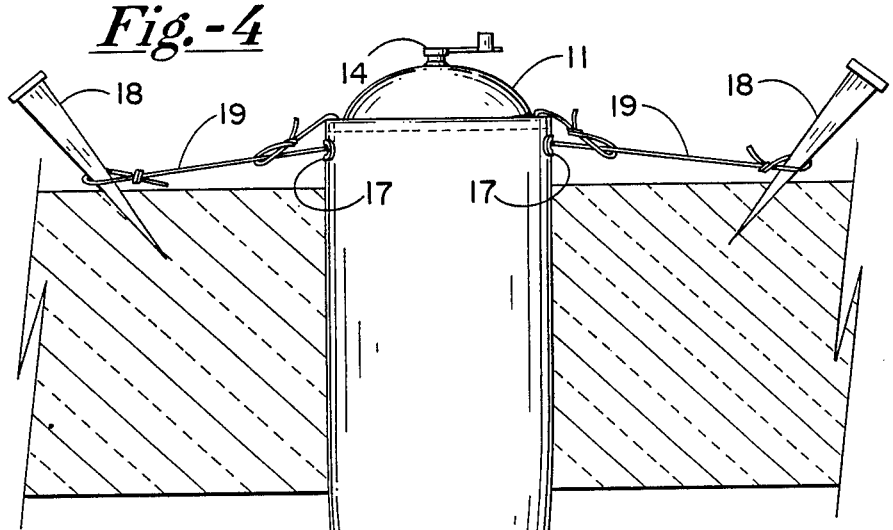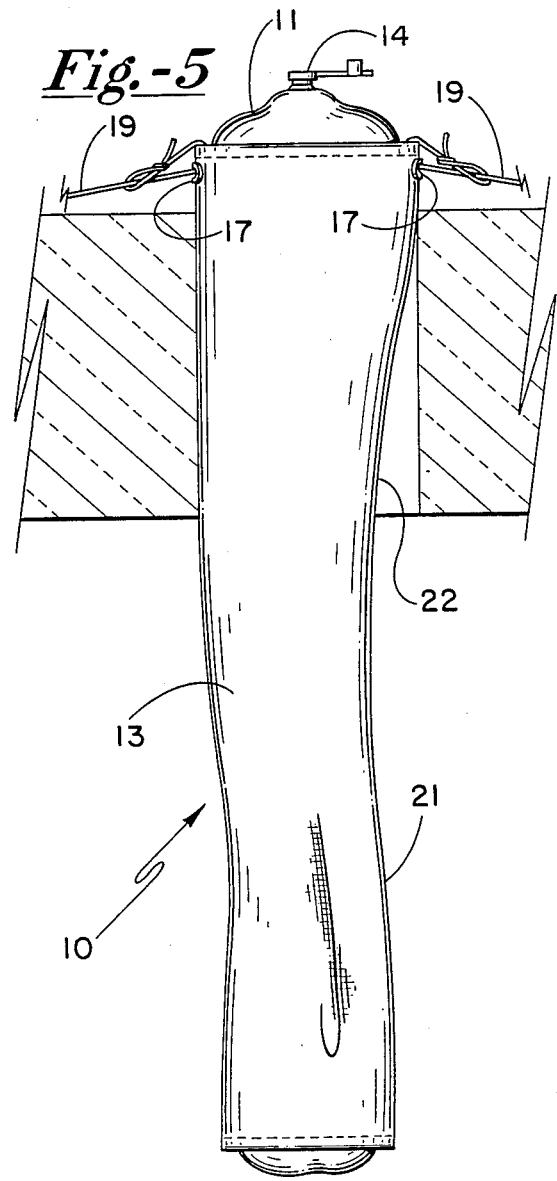

ICE FISHING HOLE MAINTAINING DEVICE

BACKGROUND OF THE INVENTION

The present invention relates generally to a removable inflatable plug for use by ice fishermen for temporarily plugging holes formed or drilled in the ice layer during fishing. Specifically, the arrangement of the present invention is utilized during those periods of time when the hole is left unattended, and the ambient weather conditions are such that ice will form and close the hole prior to the fisherman's return.

Ice fishing has become a popular sport in recent times. Specifically, access to fishing areas, including lakes and slow-flowing streams has increased, and fishermen spend more time in fishing during the winter months. Furthermore, portable shelters and clothing have improved so as to render the sport more enjoyable than in the past.

Typically, the ice fisherman, upon arriving at his chosen location, will either drill or chop a hole through the ice so as to gain access to the water. In those locales where portable shelters are utilized, this particular location may be used throughout the entire winter fishing season. Since the fisherman will typically leave the house unattended over various intervals of time, the previously prepared opening will quickly close unless means are undertaken to temporarily plug the opening during the absent time.

In the past, various techniques have been employed for forming such temporary plugs. Certain of these plugs included rigid metallic structures into which a combustible material is placed so as to heat the metal tube to a relatively high temperature when the material is ignited. Such devices have become somewhat dangerous to utilize, particularly if highly combustible material is placed within the enclosure prior to ignition. Such devices are particularly dangerous when utilized in an enclosed ice house structure. Other techniques have employed inflatable bladders of various sizes and configurations, however their design is such that it has been found difficult in some instances to remove the inflatable prior to opening the temporarily closed hole. When difficulties are encountered, the ice fisherman may tug on the inflatable bladder until it ruptures or breaks, with such rupturing or breaking frequently occurring prior to the time that the bladder is released from the walls of the hole being protected.

SUMMARY OF THE INVENTION

The structure of the present invention provides improved means of maintaining the ice fishing hole in temporarily closed disposition. The device is constructed so as to be easily and readily inflated when the fisherman desires to depart, and is further designed and constructed so as to be freely, easily, and readily removed from the ice fishing hole when the fisherman returns. Specifically, the arrangement is such that the structure is frequently self-removable from the ice fishing hole when the fisherman returns and starts deflation of the device.

Briefly, in accordance with the present invention, a means is provided for temporarily plugging holes in an ice layer, with the means comprising a hollow generally cylindrical tubular assembly with an inflatable core or bladder having closed end caps, and with a plurality of discrete layers enclosing the inflatable core. The inflatable core or bladder comprises a film of resilient flexible material characterized by retention of its flexural properties at sub-freezing temperatures. A foam liner is provided which envelops the bladder, and comprises a layer of synthetic resinous foam of generally closed-cell structure, with the foam liner having a dimension such that when wrapped about the exterior of the inflatable core, a short length or segment of overlap area is formed for assisting in the use and expedient removal properties of the structure. The structure includes an outer sleeve which envelops the foam liner, with the sleeve being formed of a generally non-resilient and water-impermeable material, with the sleeve having a diameter which is less than the diameter of the bladder when inflated so as to provide rigidity to the overall assembly when the bladder is inflated. The arrangement of the present invention has been found to provide fishermen, particularly ice fishermen, with a means for temporarily plugging holes in the ice layer, with the assembly being one which is readily inflated and put into use, and furthermore is readily removable upon the fisherman's return.

Therefore, it is a primary object of the present invention to provide an improved means for temporarily plugging holes in an ice layer for ice fishermen, with the arrangement being particularly desirable for its expediency of use, including ease of inflation and ease of removal.

It is a further object of the present invention to provide an improved means for ice fishermen to temporarily plug and preserve holes or openings in the ice layer during periods of absence, with the arrangement being particularly adapted for ease of inflation and placing into use, and particularly desirable for its ease of removal upon return of the ice fisherman.

Other and further objects of the present invention will become apparent to those skilled in the art upon a study of the following specification, appended claims, and accompanying drawings.

IN THE DRAWINGS

FIG. 1 is a perspective view of the top and axial portions of the ice fishing plug of the present invention, and illustrating the inflation valve and hold-down grommets utilized in the overall assembly;

FIG. 2 is an exploded view of the individual components forming the assembly of the present invention, and including the outer sleeve, foam liner, and inflatable bladder portions;

FIG. 4 is a view similar to FIG. 3, and illustrating the apparatus during the initial phases of deflation, and with the valve on the end cap being shown in open disposition; and FIG. 5 is a view similar to FIG. 4, and illustrating the configuration of the device during the latter phase of deflation.

DESCRIPTION OF THE PREFERRED EMBODIMENT

Figure 3:
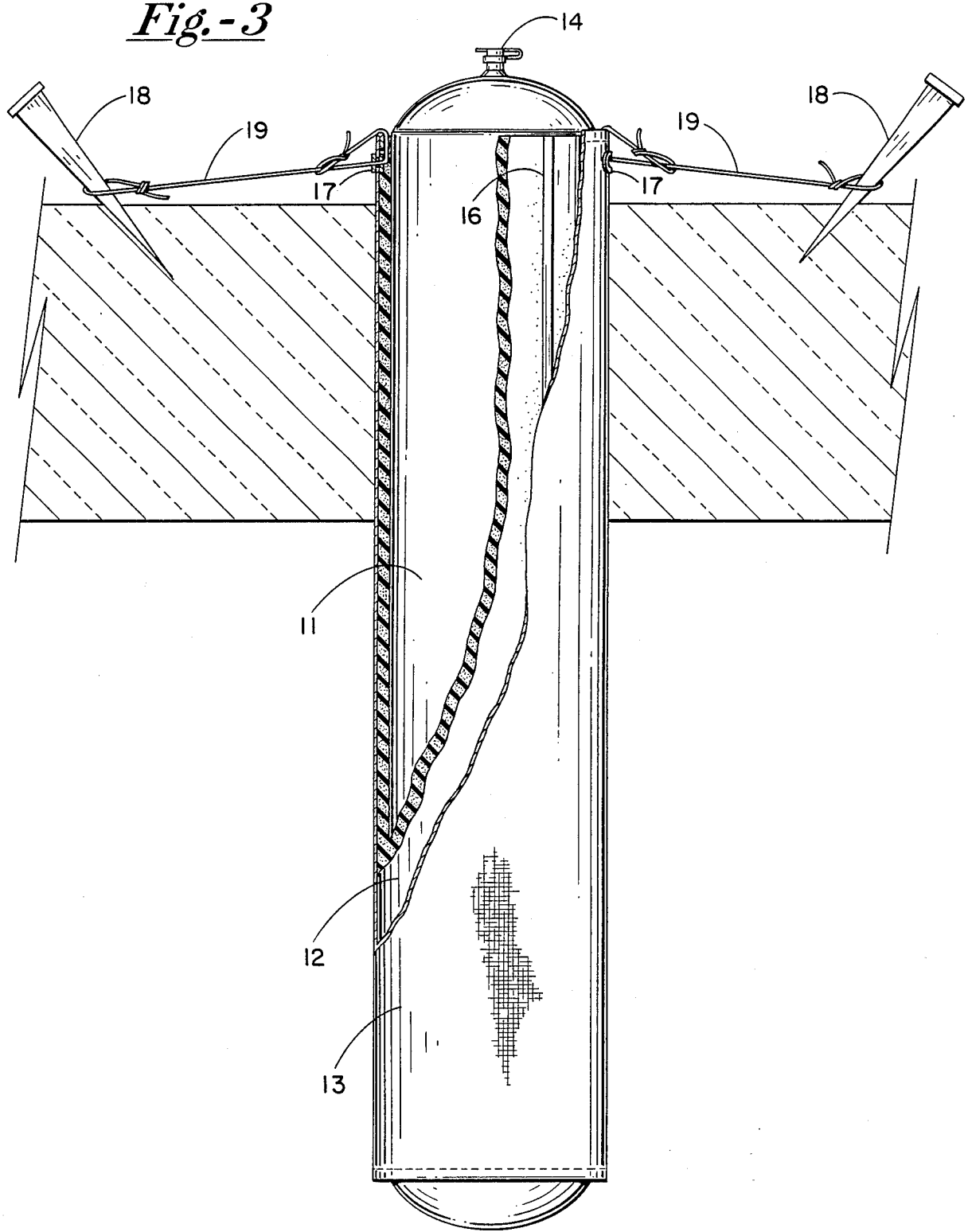
FIG. 3 is a front elevational view of the apparatus in place in the ice, and with portions of the assembly being cut away to show the cooperation of the individual components.

With attention now being directed to the drawings, FIG. 1 illustrates the overall apparatus of the present invention generally designated 10 in its assembled or completed form, and illustrating the arrangement of the various layers or elements while in inflated configuration. In the arrangement of FIG. 1, the inflation valve is shown in closed disposition, and with the bladder in fully inflated condition.

With attention now being directed to FIG. 2, the individual components of the assembly 10 are illustrated in exploded or separated form. Specifically, the bladder 11 is shown at the right of FIG. 2, with the bladder being shown in its normally expanded or inflated disposition. The arrangement includes a foam liner 12, with the liner 12 being formed of a synthetic resinous foam of generally closed-cell structure. The outer sleeve is shown at 13, with sleeve 13 being formed in generally closed-sleeve configuration and fabricated of a layer of generally non-resilient and water-impermeable material. The diameter of sleeve 13 is such that it is less than the diameter of bladder 11 when bladder 11 is freely inflated. Also, in this arrangement, the dimensional features of foam liner 12 are such that a layer of overlap is provided and included as shown at 16 in FIG. 2.

As indicated hereinabove, inflatable core or bladder 11 includes an inflation valve which may be opened and/or closed depending upon need, with the valve being shown at 14. Inflatable core bladder 11 is fabricated from a material which retains flexural properties at sub-freezing temperatures, with one typically desirable material being polyvinylchloride. Other resilient materials having the property of retention of flexural characteristics at sub-freezing temperatures may be employed as well. It is also specifically desirable that the resilient inflatable bladder be fabricated from a material which retains flexural properties at temperatures well below freezing, including temperatures as low as $-30°$ F.$--40°$ F. By way of typical dimensional characteristics, the size of the overall structure will be dependent upon the normal needs, however for most sport fishing activities, the overall assembly will have an inflated dimension of 8 inches in diameter and 48 inches in length.

The elongated length is desirable for a variety of reasons. Typically, the long length is normally sufficient to cover most ice depths during normal winters, and furthermore provides an adequate reservoir of air so as to accommodate slight leakage during long periods of absence, as well as modest thermal fluctuations. Also, as indicated above, the diameter of the bladder is such that it may expand freely to a dimension which is slightly greater or larger than the outer diameter of the enveloping foam liner and sleeve components.

Turning now to the characteristics of the foam liner 12, this component is preferably fabricated from a layer of foamed polyethylene, specifically foamed low density polyethylene. Such material has been found to be of substantially closed-cell configuration, and as such is impermeable to water. The foam structure further acts as a physical barrier to protect the enveloped bladder, and also as a modest thermal insulator. Foam low density polyethylene materials are, of course, commercially available. The density of the foam is selected so that the foam layer is flexible, and may be manually formed into the configuration illustrated in FIG. 2.

As has been indicated above, the foam acts as a physical barrier and/or protective layer, as well as a thermal insulator. In periods of extreme cold, thermal conduction from the ambient is not as likely to occur at a rapid rate when the foam layer is in place. The utilization of this foam layer thus provides the dual function of a physical protective barrier, as well as thermal insulator.

Turning now to the sleeve 13, this element or component is preferably fabricated from nylon or other suitable water-repellent material. Synthetic polyamides such as nylon are sufficiently water repellent so as to be found useful for the present invention, and 70 denier rip-stop nylon of tight weave has been found highly useful. The weave is sufficiently tight so as to provide water repellency for the overall assembly. Such material are, of course, commercially available.

In addition, and as illustrated in FIG. 2, hold-down grommets 17—17 are provided in sleeve 13 so as to permit attachment to the ice in the form illustrated in FIGS. 3-5. Also, if desired, a grommet may be positioned in sleeve 13 at the lower end in order to permit the fisherman to removably attach a minnow bucket or the like so as to preserve bait while absent from the ice-fishing scene.

Turning now to FIGS. 3-5, it will be noted in FIG. 3 that the tubular assembly is inflated, and in-place within the hole formed in the ice. The ice layer, which is formed about the entire periphery of the assembly is provided with a pair of stakes as at 18—18, along with hold-down lines 19—19 for retaining the plug in place. The ice layer envelopes approximately the upper one-third of the structure, with a certain axial length extending or protruding upwardly outwardly of the ice layer.

In actual use and installation, the device is inflated to its inflated form and forced downwardly into and through the opening formed in the ice. When fully inflated and placed through the ice, the device retains the configuration and form as illustrated in FIG. 3. This form is retained upon closure of the valve 14, and furthermore is provided with an arrangement which will normally retain this configuration and form until deflation is deliberately undertaken.

With attention now being directed to FIG. 4 of the drawings, it will be observed that valve 14 is in its open disposition, and deflation has commenced. As illustrated at 20, a zone of reduced diameter is provided, particularly due to the force of the water impinging upon the lower portions of the ice plug device. The water within the lake or stream provides hydrostatic pressure on the device and closes as deflation continues, and with particular attention being directed to FIG. 5 of the drawings, the areas of reduced diameter are occurring at and along the axial length of the structure, including the portions as shown at 21 and at 22. In the area adjacent and in contact with the ice layer, a zone of separation occurs as at 22, with this zone of separation normally occurring initially at and along the line of overlap 16 of the foam liner of FIG. 2.

For purposes of security, and if desired, the device could be rendered secure against theft by utilizing the grommets 17-17 for receiving a locking device if desired.

It will be appreciated and understood, of course, that the various aspects of the present invention may include departures from the specific illustration provided herein, with such departures being within the normal skill of the art.

What is claimed is:

1. Removable inflatable means for temporarily plugging holes in an ice layer comprising:
   (a) a hollow generally cylindrical tubular assembly with an inflatable generally resilient bladder core having closed end caps and with a plurality of discrete layers enclosing the inflatable core portion thereof and including a foam liner enclosing said bladder, and an outer sleeve, with the outer sleeve enclosing and enveloping said foam liner;

(b) said inflatable core bladder comprising a film of resilient flexible substance characterized by the retention of flexural properties at sub-freezing temperatures;

(c) said foam liner comprising a layer of synthetic resinous foam of generally closed-cell structure, and being wrapped about the exterior of said inflatable core bladder and forming a shell thereabout, said foam liner having an overlap segment about at least a portion of the length of said bladder; and (d) said outer sleeve being a generally closed tube fabricated of a layer of non-resilient and water-impermeable material and having a diameter which is less than the diameter of said bladder when fully inflated, the arrangement being such that said tubular assembly becomes generally erect and rigid upon inflation of said bladder.

2. The removable inflatable means as defined in claim 1 being particularly characterized in that hold-down grommets are mounted within said sleeve adjacent the upper end thereof.

3. The removable inflatable means as defined in claim 1 being particularly characterized in that an inflation valve is provided within said bladder on one end cap thereof.

4. The removable inflatable means as defined in claim 3 wherein said hold-down grommets are adjacent the end cap in which the inflation valve is positioned.

5. The removable inflatable means as defined in claim 1 being particularly characterized in that said foam liner covers essentially the entire axial length of said bladder.

6. The removable inflatable means as defined in claim 5 and wherein the area of overlap of said foam liner extends along essentially the entire axial length of said bladder.

* * * * *